US008090575B2

(12) United States Patent
Hall et al.

(10) Patent No.: US 8,090,575 B2
(45) Date of Patent: Jan. 3, 2012

(54) VOICE MODULATION RECOGNITION IN A RADIO-TO-SIP ADAPTER

(75) Inventors: Douglas Hall, Raleigh, NC (US); Daniel Floyd, Raleigh, NC (US)

(73) Assignee: JPS Communications, Inc., Raleigh, NC (US)

( * ) Notice: Subject to any disclaimer, the term of this patent is extended or adjusted under 35 U.S.C. 154(b) by 782 days.

(21) Appl. No.: 11/833,406

(22) Filed: Aug. 3, 2007

(65) Prior Publication Data
US 2008/0033719 A1   Feb. 7, 2008

Related U.S. Application Data

(60) Provisional application No. 60/835,568, filed on Aug. 4, 2006.

(51) Int. Cl.
G10L 19/14 (2006.01)
H04B 1/16 (2006.01)
H04B 1/10 (2006.01)
(52) U.S. Cl. ......... 704/211; 704/233; 455/205; 455/221
(58) Field of Classification Search .......... 704/208–211, 704/233
See application file for complete search history.

(56) References Cited

U.S. PATENT DOCUMENTS

| | | | | |
|---|---|---|---|---|
| 4,187,396 A | * | 2/1980 | Luhowy | 704/233 |
| 4,414,689 A | * | 11/1983 | Enderson | 455/221 |
| 4,484,344 A | * | 11/1984 | Mai et al. | 704/233 |
| 4,550,426 A | * | 10/1985 | Gillig et al. | 704/233 |
| 4,628,529 A | * | 12/1986 | Borth et al. | 381/94.3 |
| 4,630,304 A | * | 12/1986 | Borth et al. | 381/94.3 |
| 4,893,349 A | * | 1/1990 | Eastmond et al. | 455/205 |
| 5,230,089 A | * | 7/1993 | Kindinger et al. | 455/79 |
| 5,267,323 A | * | 11/1993 | Kimura | 381/110 |
| 5,479,474 A | * | 12/1995 | Schwartzman et al. | 455/570 |

(Continued)

FOREIGN PATENT DOCUMENTS

WO   WO 2006018635 A1 *  2/2006

OTHER PUBLICATIONS

PCT/US2007/017366 International Search Report dated Jan. 10, 2008.
Voice Board Corporation, Bridgeway Radion Controller and VoIP Gateway, Jul. 21, 2006, p. 1-8, Camarillo, California.
Douglas Hall, SIP & Mobility Bringing Radio into the 21st Century, SIP Magazine, Nov. 2006, vol. 1, No. 6.
Notification Concerning Transmittal of International Preliminary Report on Patentability (Chapter 1 of the Patent Cooperation Treaty) and the Written Opinion of the International Searching Authority, PCT/US2007/017366 dated Feb. 19, 2009.

*Primary Examiner* — Richemond Dorvil
*Assistant Examiner* — Olujimi Adesanya
(74) *Attorney, Agent, or Firm* — Daly, Crowley, Mofford & Durkee, LLP

(57) ABSTRACT

A radio-to-SIP adapter is shown to include a voice detection algorithm processor as well as other circuitry to provide an interface between a radio and SIP adapter to accommodate a transition from half duplex to full duplex and to cause a radio to transmit when human speech is present in an audio signal from a telephony network.

6 Claims, 2 Drawing Sheets

U.S. PATENT DOCUMENTS

| | | | |
|---|---|---|---|
| 5,563,952 A * | 10/1996 | Mercer | 381/56 |
| 6,249,757 B1 * | 6/2001 | Cason | 704/214 |
| 6,397,050 B1 * | 5/2002 | Peterson et al. | 455/221 |
| 6,397,186 B1 * | 5/2002 | Bush et al. | 704/274 |
| 6,574,592 B1 * | 6/2003 | Nankawa et al. | 704/206 |
| 6,662,156 B2 * | 12/2003 | Bartosik | 704/233 |
| 6,993,480 B1 * | 1/2006 | Klayman | 704/226 |
| 2003/0165135 A1 * | 9/2003 | Itzkovitz et al. | 370/352 |
| 2003/0206624 A1 * | 11/2003 | Domer et al. | 379/406.01 |
| 2003/0224825 A1 | 12/2003 | Cox et al. | |
| 2004/0121729 A1 * | 6/2004 | Herndon et al. | 455/12.1 |
| 2004/0260540 A1 | 12/2004 | Zhang | |
| 2005/0239485 A1 * | 10/2005 | Kundu et al. | 455/519 |
| 2006/0172754 A1 | 8/2006 | Shin et al. | |

\* cited by examiner

VOICE MODULATION RECOGNITION IN A RADIO-TO-SIP ADAPTER

CROSS-REFERENCE TO RELATED APPLICATIONS

This application claims priority under 35 U.S.C. §119(e) from U.S. provisional application No. 60/835,568 filed on Aug. 4, 2006.

FIELD OF THE INVENTION

This invention relates generally to hand held radio equipment and more particularly to systems and techniques to interface such hand-held radio equipment to telephony networks.

BACKGROUND OF THE INVENTION

Hand-held radio equipment is often used in public safety and during an emergency it is often desirable to connect the hand-held radio to a telephone network. In recent times, telephone networks are implementing a new communication technique commonly referred to as Voice over IP, where voice communication is communicated using an Internet Protocol (IP) network. The Voice over IP community has adopted Session Initiation Protocol (SIP) as a protocol of choice for signaling. SIP is a signaling protocol used for establishing sessions in an IP network and is an RFC standard (RFC 3261) understood by those skilled in the art. Using SIP, telephony becomes another web application and integrates with other Internet services.

In public safety applications, it is often desirable to interface hand-held radio equipment to a telephony network through a so called Radio-to-SIP adapter. Such hand-held radio equipment which typically operate in half-duplex lacks a means of being controlled by the calls through the SIP network without requiring operator intervention of some type.

It is desirable to provide a technique where radio calls from the network using SIP can control the activation of the radio transceiver switching the transceiver from receive to transmit and back to receive again when the party on the telephony network wishes to speak.

SUMMARY OF THE INVENTION

In accordance with the present invention, a radio-to-SIP adapter includes a voice detection algorithm processor to detect the presence of human speech in an audio signal; an audio input to receive an audio signal; and a radio transmit indicator signal output to provide a signal to indicate that human speech is present in the audio signal. With such an arrangement, radio calls can be initiated by the telephony network using SIP without requiring operator intervention.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
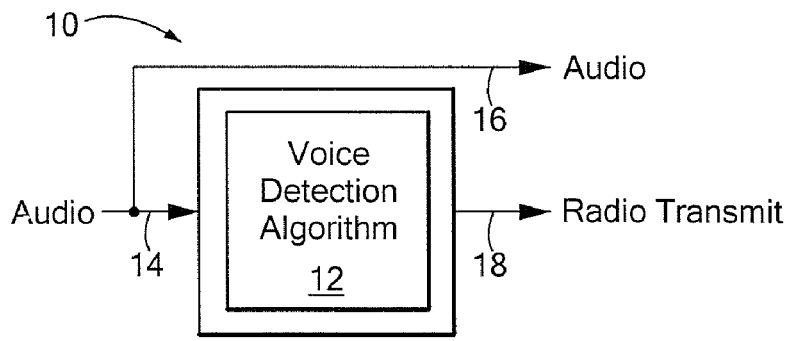
FIG. 1 is a block diagram of a voice modulation recognition radio-to-SIP adapter according to the invention.

One familiar with hand-held radios will appreciate that in normal operation the radio operates in what is known as half duplex mode where a receive signal is received through the receiver and an audio output is provided by the speaker to an user. When the user wishes to talk, a push-to-talk button is depressed which activates the transmitter and the user speaks into the microphone to transmit. For ease of operation, most hand-held radios provide an external microphone and speaker interface so that an external microphone and speaker headset can be used. A base station is similar to a hand-held radio except being configured for a more permanent location. In a typical operation, a plurality of hand-held radios will communicate among each other and with a base station.

When a radio transceiver, which is half-duplex in nature, is interfaced to a SIP (Session Initiation Protocol) telephony network, which is full-duplex in nature, the need exists to control the activation of the transmitter, switching it from receive to transmit and back again when the party on the telephony network wishes to speak. By analyzing the audio from the telephony network and using an appropriate signal processing algorithm the determination of the existence of human speech energy can be made and a transmitter can controlled efficiently. Existing systems use an absolute level sensing system referred to as VOX (voice operated switching) which does not examine the content of the audio. Background noise and non-speech signals can "false" the activation of the transmitter. Other methods involve designating a key on a telephone keypad as a "push-to-talk" (PTT) button, but this requires user training and is prone to error.

In the present invention, a radio is activated when the user of the SIP telephony device speaks, but is not activated by background noise or other non-speech signals. This provides a reliable and transparent conversion from a half-duplex radio system to a full-duplex SIP telephony network. The present invention allows radio transceivers to be connected to a telephony network via SIP (Session Initiation Protocol). One problem with such an interface is the disparity between the half-duplex nature of the radio (one may transmit or receive, but not both at the same time) and the full-duplex nature of the telephony environment. The present invention uses a signal processing algorithm of the type referred to as voice modulation recognition or voice detection to activate the transmitter to ensure that the transmitter will only transmit when the party on the telephony network is speaking, and will not transmit due to background noise or other non-speech signals. Such an algorithm in a Radio-to-SIP interface is unique and provides a highly effective method of connecting half-duplex communication devices to a SIP telephony network. The radio appears as any other SIP end point and the user requires no training and is not required to push a specified key on a telephone keypad to activate the transmitter as some systems may require.

Referring now to FIG. 1, a radio-to-SIP adapter 10 is shown to include a voice detection algorithm processor 12 as well as other circuitry (not shown) to provide an interface between a radio and SIP adapter. It should be appreciated the radio-to-SIP adapter 10 can be a stand alone unit or included as part of an SIP adapter during manufacturing of the SIP adapter. The radio-to-SIP adapter 10 includes an audio signal input 14 which also provided as an output 16. The audio input signal includes the audio that is to be tested for the presence of human speech. The radio-to-SIP adapter 10 also includes a radio transmit signal output 18. The radio transmit signal provides an indication to the radio that the radio is to enable its transmitter and transmit audio.

The radio-to-SIP adapter 10 is disposed between the local radio and the SIP adapter that provides an interface into the IP network that the Voice over IP communication application is operating.

Figure 2:
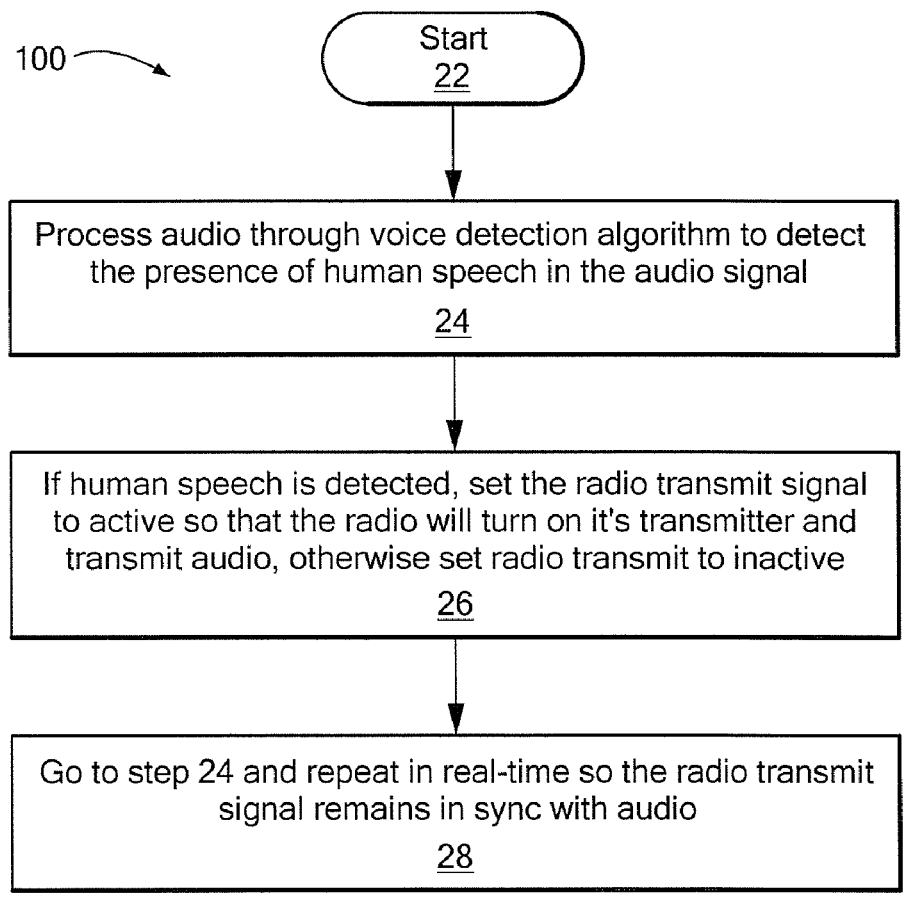
FIG. 2 is a flow chart showing the operation of the radio-to-SIP adapter according to the invention.

Referring now to FIG. 2, a flow chart 100 is shown describing the operation of the radio-to-SIP adapter 10 starting at step 22. As shown in step 24, the radio-to-SIP adapter monitors the audio signal input 14 for audio and processes the audio through the voice detection algorithm processor 12 to detect the presence of human speech in the audio signal. As shown in step 26, if human speech is detected, the radio-to-SIP adapter 10 sets the radio transmit signal to active so the that radio will turn on its transmitter and transmit audio, otherwise the radio-to-SIP adapter 10 sets the radio transmit to inactive. As shown in step 28, steps 24 and 26 are repeated in real time so that the radio transmit signal remains in sync with the audio signal.

It should be appreciated that a flowchart represents computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The voice detection algorithm performed by the processor 12 can be any voice detection algorithm that can detect human speech. For example, a one example of a voice detection algorithm that can detect human speech has been implemented using a Texas Instrument TMS320VC5409 digital signal processor. It should be noted, unlike a speech recognition device where speech is being analyzed to convert speech to text, in the present device the audio is being analyzed to detect the presence of human speech.

Figure 3:
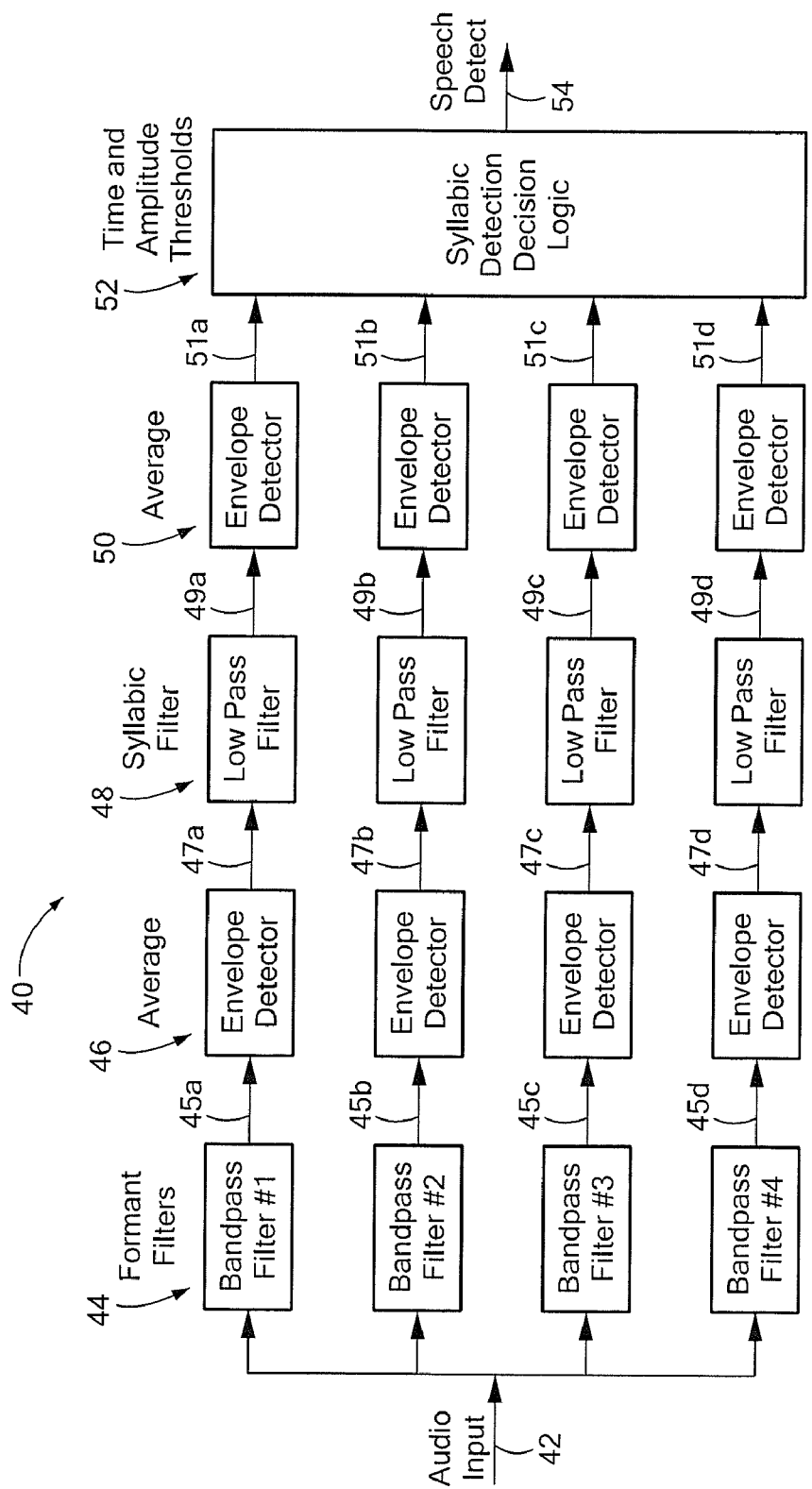
FIG. 3 is a block diagram of a voice detection algorithm implemented in software according to the invention.

Referring now to FIG. 3, a block diagram of a voice detection algorithm 40 implemented by software in processor 12 is shown to include an audio input 42. The audio is segregated by a plurality of band pass filters 44 into a plurality of signals 45a, 45b, 45c, 45d having various frequencies within each of the respective bandwidths. Each one of the plurality of signals 45a-45d are fed into a respective one of the envelope detectors 45 where such signals are averaged. Each one of the output signals 47a, 47b, 47c, 47d are fed into a respective one of a plurality of low pass filters 48. Each one of the output signals 49a, 49b, 49c, 49d are fed into a respective one of a plurality of envelope detectors 50 where such signals are averaged. Each one of the output signals 51a, 51b, 51c, 51d are fed into syllabic detection decision logic 52 where the various time and amplitude thresholds of the signals fed into the syllabic detection decision logic 52 are used to determine the presence of human speech as learned from prior known human speech. The latter will recognize the presence of speech in the midst of other sounds such as radio static and background noise. When the presence of human speech is detected, a speech detect signal 54 is provided to activate the radio as appropriate.

It should now be appreciated the radio-to-SIP adapter 10 monitors the audio signal from the telephony network and activates the radio transmitter when the radio-to-SIP adapter 10 detects human speech.

Having described the preferred embodiment of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A radio-to-Session Initiation Protocol (SIP) adapter comprising:
   a voice detection algorithm processor to detect the presence of human speech in an audio signal, the processor segregating the audio signal into a plurality of signals having various frequencies within each signal bandwidth and feeding the plurality of signals into syllabic detection decision logic to determine the presence of human speech, the processor comprising:
      bandpass filters to provide the plurality of signals having various frequencies;
      a first set of envelope detectors to average signals received from the bandpass filter, each detector of the first set of envelope detectors being coupled to the output of a respective one of the bandpass filters;
      low pass filters, each low pass filter being coupled to the output of a respective one of the envelope detectors; and
      a second set of envelope detectors, each of the detectors of the second set of envelope detectors being coupled to the output of a respective one of the low pass filters;
      the syllabic detection decision logic coupled to the outputs of the second set of envelope detectors and configured to use time and amplitude thresholds of the signals received from the second set of enveloped detectors to determine the presence of human speech based on prior known human speech;
   an audio input to receive an audio signal; and
   a radio transmit indicator signal output to provide a signal to indicate that human speech is present in the audio signal to activate a transmitter to transmit the audio signal.

2. The radio-to-SIP adapter as recited in claim 1 wherein the radio-to-SIP adapter is integrated with a SIP adapter.

3. The radio-to-SIP adapter as recited in claim 1 wherein the voice detection algorithm processor comprises a Texas Instrument TMS320VC5409 digital signal processor.

4. A method comprising:
   using a computer processor to cause a radio to transmit comprising:
      monitoring an audio signal and processing the signal with a voice detection algorithm to detect the presence of human speech in the audio signal, the processing comprising:
         segregating the audio signal into a plurality of signals having various frequencies within each signal bandwidth using bandwidth filters;
         averaging the output of each of the bandwidth filters using a first set of envelope detectors;
         filtering the output of each of the first set of envelope detectors using low pass filter;

averaging the output of each of the low pass filters using a second set of envelope detectors; and feeding the output of each of the second set of envelope detectors into syllabic detection decision logic to determine the presence of human speech;

detecting the presence of human speech based on prior known human speech using time and amplitude thresholds of the signals received from the outputs of the second set of enveloped detectors;

activating a radio transmit signal if human speech is detected to cause a radio to transmit audio; and deactivating a radio transmit signal if human speech is not detected to cause a radio not to transmit audio.

5. The method as recited in claim 4 wherein the audio signal is from a telephony network and the method is repeated to remain in sync with the human speech in the audio signal.

6. A radio-to-Session Initiation Protocol (SIP) adapter comprising:

a voice detection algorithm processor to detect the presence of human speech in an audio signal, said processor segregating the audio signal into a plurality of signals having various frequencies within each signal bandwidth and feeding said plurality of signals into syllabic detection decision logic to determine the presence of human speech, the processor comprising:

bandpass filters to provide the plurality of signals having various frequencies;

a first set of envelope detectors to average signals received from the bandpass filter, each detector of the first set of envelope detectors being coupled to the output of a respective one of the bandpass filters;

low pass filters, each low pass filter being coupled to the output of a respective one of the envelope detectors; and a second set of envelope detectors, each of the detectors of the second set of envelope detectors being coupled to the output of a respective one of the low pass filters;

the syllabic detection decision logic coupled to the outputs of the second set of envelope detectors and configured to use time and amplitude thresholds of the signals received from the second set of enveloped detectors to determine the presence of human speech based on prior known human speech;

an audio input to receive an audio signal from a telephony network;

a radio transmit indicator signal output to provide a signal to indicate that human speech is present in the audio signal and to cause a radio to transmit audio when human speech is present in the audio signal from the telephony network.

* * * * *